Patented Nov. 30, 1943

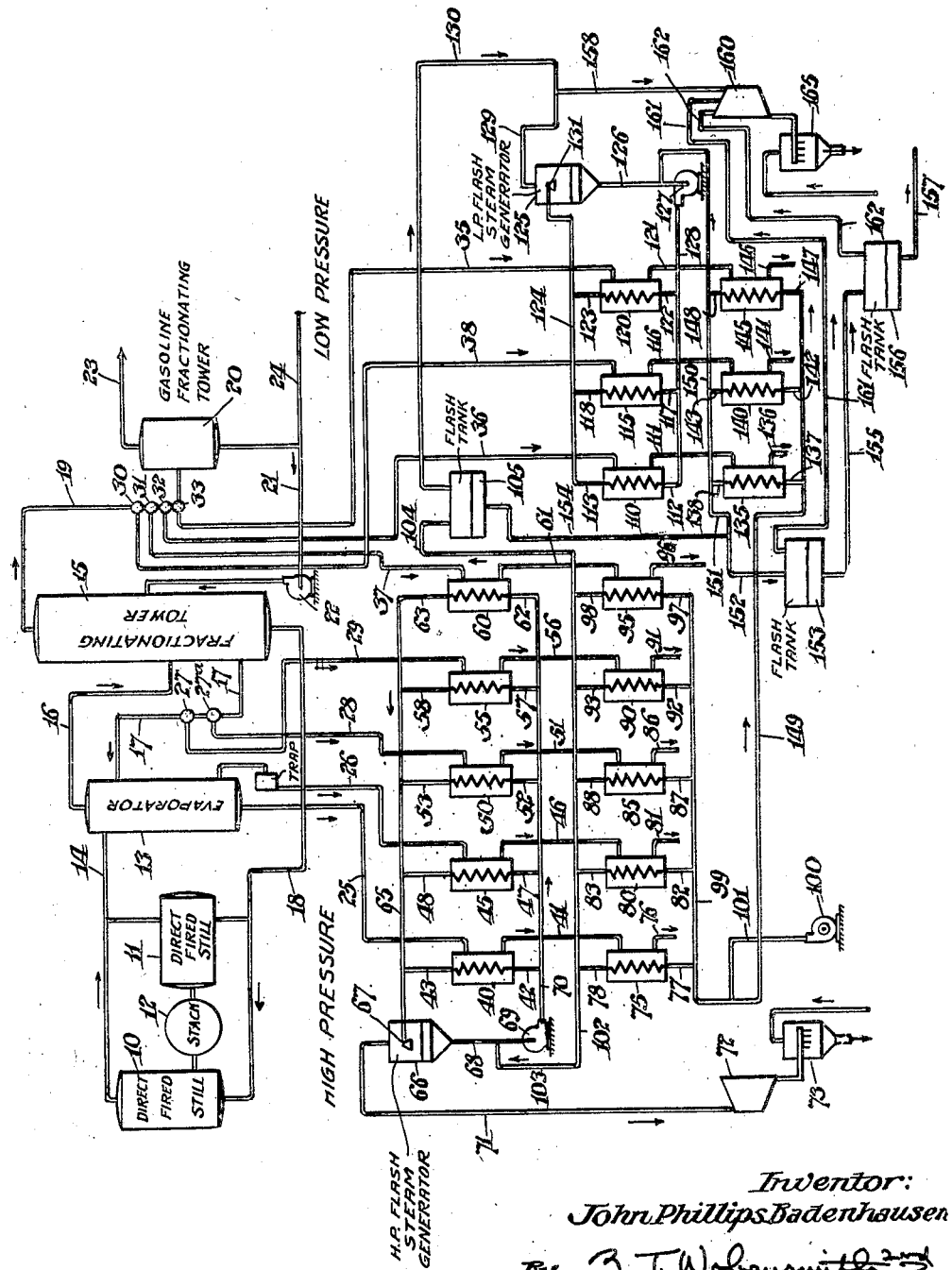

2,335,727

UNITED STATES PATENT OFFICE 2,335,727

WASTE HEAT RECOVERY SYSTEM

John Phillips Badenhausen, Philadelphia, Pa.

Application May 15, 1940, Serial No. 335,264

7 Claims. (Cl. 122—34)

This invention relates to waste heat recovery systems and more particularly to systems for utilizing heat derived from the cooling of fluent materials, which cooling is essential for obtaining the desired products in proper condition from chemical or other production processes.

This invention further relates to waste heat recovery systems in which hot media at a plurality of temperatures are utilized as a source of heat for power production.

The invention further and more specifically relates to the utilization of heat which is available in and which has heretofore been wasted during the refining of crude oil for gasoline or gas production.

It is the principal object of the present invention to provide a waste heat recovery system in which heat available as a necessary incident of manufacturing processes is recovered in the form of energy available for power production.

It is a further object of the present invention to provide a waste heat recovery system in which the most effective utilization of the heat which is available is made, the system preferably being operable at a plurality of pressure or temperature levels.

It is a further object of the present invention to provide a system for waste heat utilization in which the heat transfer from the hot medium which is to be cooled is carried out in the most effective manner.

It is a further object of the present invention to provide a waste heat utilization system in which indirect cooling of a hot medium is employed for heating a motive fluid in liquid state to the desired heat content and in which a change of state of the motive fluid is effected prior to the energy extraction from the motive fluid.

It is a further object of the present invention to provide a waste heat utilization system in which indirect cooling of a hot medium is employed for heating a motive fluid in liquid state to the desired heat content and in which a change of state of the motive fluid is effected prior to the energy extraction from the motive fluid, this being effected at a plurality of pressure levels.

Other objects of the invention will be apparent from the annexed specification and claims.

The nature and characteristic features of the invention will be more readily understood from the following description, taken in connection with the accompanying drawing forming part hereof, in which:

The figure of the drawing is a diagrammatic view of a preferred embodiment of the present invention in its application to an oil refinery.

It will, of course, be understood that the description and drawing herein contained are illustrative merely, and that various modifications and changes may be made in the structure and methods disclosed without departing from the spirit of the invention.

Referring more particularly to the drawing there is therein illustrated a simplified diagrammatic lay-out of oil refinery apparatus for the production of gas and gasoline from crude oil.

The system of the present invention is not restricted to use with the specific oil refinery system shown, but will be described in connection therewith since the provisions required in connection with the refinery system find ready use in other chemical and manufacturing processes.

The oil refinery system requires a large heat input and produces a number of derivative products which are obtained over a wide range of temperatures. The respective individual temperatures of withdrawal of the products adhere closely to predetermined values. These derivative products, also, when delivered to storage are delivered at temperatures which are not ordinarily permitted to vary very widely from their predetermined values and these values are determined by the nature and characteristics of the particular derivative.

The products in their heated state and as received from the refinery system constitute hot media at different temperatures containing large quantities of heat. This heat has not heretofore been effectively utilized and the present system is particularly adapted for transfer of the wasted heat and the production of power.

In the simplified diagrammatic view of the refinery system herein illustrated direct fired stills 10 and 11 are provided, these being connected to a stack 12 in the customary manner for the discharge of the exhaust gases of combustion.

An evaporator 13 is provided which receives the distillate from the stills 10 and 11 through a suitable line 14. The evaporator 13 is preferably connected to a fractionating tower 15 by a suitable line 16, the fractionating tower 15 being tapped and connected by a line 17 for recirculating portions of the hydrocarbons therein back to the evaporator 13.

The fractionating tower 15 is also connected by a line 18 to the stills 10 and 11 for the return of hydrocarbons to the stills 10 and 11 for further treatment.

The fractionating tower 15 is also preferably connected by a line 19 to a gasoline fractionating tower 20 and a return line 21 is provided from the gasoline fractionating tower 20 to the fractionating tower 15, a pump 22 being provided in this line 21 for recirculation.

The gasoline fractionating tower 20 has a gas outlet line 23 for the withdrawal of gas for use in firing the stills or for other purposes and a gasoline outlet line 24 is provided for the withdrawal of refined gasoline.

In connection with the refining operations certain of the heavier products are withdrawn from the evaporator 13 at temperatures in accordance with their characteristics and a line 25 is provided for the withdrawal at a relatively high temperature which may be of the order of 712° F., this line 25 being connected, as hereinafter more fully pointed out, into the recovery system.

The evaporator 13 also has provision for the withdrawal therefrom of other material, such for example, as fuel oil, also at a relatively high temperature which may be of the order of 665° F., and the evaporator 13 is connected to the recovery system by the line 26, as hereinafter more fully pointed out.

A return line 17 from the fractionating tower 15 to the evaporator 13 is provided and from this line 17 through suitable condensers 27 and 27a or similar apparatus provision is made for withdrawal of various products of the refinery operation. One of these products is withdrawn at a temperature of the order of 483° F. through a line 28. Another of these products at a temperature of the order of 464° F. is withdrawn through the line 29.

The fractionating tower 15 is also connected to the gasoline fractionating tower 20 by a suitable line 19 which is provided with suitable apparatus, such as condensers 30, 31, 32 and 33 for the withdrawal at different temperatures of a number of products from the refining process.

Provision is made for the withdrawal through the line 35 of one of these products at a temperature of the order of 296° F., through the line 36 for another of these products at a temperature of the order of 341° F., through the line 37 for another of these products at a temperature of the order of 437° F., and through the line 38 for another of these products at a temperature of the order of 315° F., the temperatures of these products varying in accordance with the specific material. The products are conducted to and their heat utilized in the heat recovery system as hereinafter more fully pointed out.

The temperatures herein set forth are not stated by way of limitation but as comparative and illustrative of a particular installation.

The motive fluid employed is not limited to a particular material, although in view of the quantities required water is preferred.

The heat recovery system preferably includes a plurality of heat exchangers suitably connected for operation at a plurality of heat levels and also connected to suitable prime movers. The heat exchangers may be of any desired form for liquid-to-liquid heat exchange. The heat exchangers preferably do not permit of the mixing of the motive fluid with the hot media from the cooling of which the heat is derived. The heat exchangers may be arranged in any desired relationship with respect to the refining system for the most compact construction, for ease in installation, and for ease of inspection and maintenance.

The heat recovery system as hereinafter set forth preferably has a high pressure side and a low pressure side for the most effective utilization of the heat derived from the cooling of the products of the refining operation.

The heat exchangers employed on the high pressure side preferably consist of two groups, one group being operated at higher temperature levels and receiving the respective hot media directly from the refinery system, and the other being operable at lower temperature levels and receiving for further heat exchange the media which have been partially cooled in the high temperature group of heat exchangers. The cooling of the hot media in the higher temperature group of heat exchangers of the higher pressure side is preferably to a uniform temperature level for introduction into the associated lower temperature group of heat exchangers. The cooling of the hot media in the lower temperature group of heat exchangers of the high pressure side is preferably to different temperatures such as those utilized for delivery to and for initial storage of the products from the refining operation.

The heat exchangers for the higher temperature level are preferably also designed with relation to the heat input from the hot media so that the output temperature of the motive fluid heated therein will be substantially constant and uniform for all.

The heat exchanger 40 is preferably designed to receive the hot medium from the line 25 at a relatively high temperature and this medium is delivered, after giving up a portion of its heat and being reduced to a predetermined temperature of the order of 350° F., through the line 41, as hereinafter more fully pointed out. Provision is made for introducing the motive fluid in liquid form through the line 42 and at a predetermined temperature level which may be of the order of 337° F. into the heat exchanger 40 for the absorption of heat therein from the hot medium supplied by the line 25. The motive fluid is preferably heated to a temperature of the order of 350° F. and maintained at a pressure such that it is not vaporized but remains in liquid condition for delivery in liquid condition through the outlet 43. This pressure may be of the order of 134.6 pounds per square inch absolute.

The heat exchanger 45 is preferably designed to receive the hot medium from the line 26 at a relatively high temperature and a temperature different from that of the supply to the heat exchanger 40. This medium is delivered, after giving up a portion of its heat and being reduced to the same temperature as that in the line 42, through the line 46, as hereinafter more fully pointed out. Provision is made for introducing the motive fluid in liquid form through the line 47 and at a predetermined temperature level which may be of the order of 337° F. into the heat exchanger 45 for the absorption of heat therein from the hot medium supplied by the line 47. The motive fluid is preferably maintained at a pressure such that it remains in liquid condition for delivery in liquid condition through the outlet 48 and is preferably raised to the same output temperature which prevails in the line 43.

The heat exchanger 50 is preferably designed to receive the hot medium from the line 28 at a relatively high temperature and a still different temperature than that of the medium delivered to the other heat exchangers. This medium is delivered through the line 51, after giving up a portion of its heat and being reduced to the same temperature as that in the line 46, as hereinafter more fully pointed out. Provision is made for introducing the motive fluid in liquid form into the heat exchanger 50 through the line 52 and at the same inlet temperature as that prevailing with the other heat exchangers in the same group for the absorption of heat therein from the hot medium supplied by the line 28. The motive fluid is preferably maintained at a pressure such that it remains in liquid condition for delivery in liquid condition through the outlet 53 at a temperature corresponding to that common to other heat exchangers in the higher temperature group.

The heat exchanger 55 is preferably designed to receive the hot medium from the line 29 at a relatively high temperature and at a temperature different from that of the supply to other heat exchangers in this group. This medium is delivered through the line 56, after giving up a portion of its heat and having its temperature reduced to the desired level, as hereinafter more fully pointed out. Provision is made for introducing the motive fluid in liquid form into the heat exchanger 55 through the line 57 and at the same inlet temperature as that prevailing with the other heat exchangers in the same group for the absorption of heat therein from the hot medium supplied by the line 29. The motive fluid is preferably maintained at a pressure such that it is not vaporized but remains in liquid condition for delivery in liquid condition through the outlet 58.

The heat exchanger 60 is preferably designed to receive the hot medium from the line 37 at a relatively high temperature and at a temperature different from that of the supply to the other heat exchangers in the same group. This medium is delivered through the line 61, after giving up a portion of its heat and having its temperature reduced to the desired level, as hereinafter more fully pointed out. Provision is made for introducing the motive fluid in liquid form into the heat exchanger 60 through the line 62 and at the same inlet temperature as that prevailing with the supply to the other heat exchangers in this group for the absorption of heat therein from the hot medium supplied by the line 37. The motive fluid is preferably maintained at a pressure such that it is not vaporized but remains in liquid condition for delivery in liquid condition through the outlet 63.

The outlets 43, 48, 53, 58 and 63 of the heat exchangers 40, 45, 50, 55 and 60 are connected to a line 65 which leads into a high pressure flash steam generator 66 to which the motive fluid is conducted in liquid form.

The high pressure flash steam generator 66 may be of any preferred type, but preferably consists of a vessel into which the liquid from the line 65 is discharged under pressure conditions such that the pressure in the vessel is lower than that in the line 65 to permit the motive fluid by its pressure drop to be evaporated or changed from its liquid to its gaseous or vapor form. One or more nozzles 67 may, if desired, be employed for assisting in this change of condition. The major portion of the liquid is thus converted into steam or gaseous form at a lower pressure than that prevailing in the line 65. This pressure is dependent upon the quantity of heat available in the motive fluid in liquid form and may, if desired, be of the order of 114 pounds per square inch absolute.

The liquid in the lower part of the high pressure flash steam generator 66 is conducted through a pipe 68 to a pump 69 and from the pump 69 through a line 70 which is connected to the respective inlets 42, 47, 52, 57 and 62 of the heat exchangers 40, 45, 50, 55 and 60.

The high pressure flash steam generator 66 has the steam outlet thereof connected by a steam main 71 to a prime mover. The prime mover preferably comprises a steam turbine 72 to which a condenser 73 is connected for operation of the turbine 72 at a high vacuum. The condenser 73 may be of any desired type, but is preferably a jet condenser and is preferably operated at approximately 28 inches of vacuum.

The heat exchangers of the low temperature group for the high pressure side preferably also consist of heat exchangers for a liquid-to-liquid heat exchange and are preferably designed to receive the hot media from the high temperature heat exchangers 40, 45, 50, 55 and 60, respectively, the respective temperatures at which the hot media are introduced to the respective low temperature heat exchangers preferably being substantially constant and uniform.

The heat exchanger 75 preferably receives the hot medium from the line 41. This medium is cooled in the heat exchanger 75 and gives up a portion of its heat so that its temperature is reduced to that desired for the delivery of the medium through a line 76 to storage in accordance with its particular characteristics. This temperature may be of the order of 208° F.

An input line 77 is provided for the heat exchanger 75 through which the motive fluid in liquid form is introduced. The motive fluid is heated in the heat exchanger 75 by the transfer of heat thereto from the hot medium, the motive fluid being delivered in liquid form through the outlet 78.

The heat exchanger 80 preferably receives the hot medium from the line 46. This medium is cooled in the heat exchanger 80 and gives up a portion of its heat so that its temperature is reduced to that desired for the delivery of the medium through a line 81 to storage in accordance with its particular characteristics. This temperature may be of the order of 115° F.

An input line 82 is provided for the heat exchanger 80 through which the motive fluid in liquid form is introduced. The motive fluid is heated in the heat exchanger 80 by the transfer of heat thereto from the hot medium, the motive fluid being delivered in liquid form through the outlet 83.

The heat exchanger 85 preferably receives the hot medium from the line 51. This medium is cooled in the heat exchanger 85 and gives up a portion of its heat so that its temperature is reduced to that desired for the delivery of the medium through a line 86 to storage in accordance with its particular characteristics. This temperature may be of the order of 75° F.

An input line 87 is provided for the heat exchanger 85 through which the motive fluid in liquid form is introduced. The motive fluid is heated in the heat exchanger 85 by the transfer of heat thereto from the hot medium, the motive fluid being delivered in liquid form through the outlet 88.

The heat exchanger 90 preferably receives the hot medium from the line 56. This medium is cooled in the heat exchanger 90 and gives up a portion of its heat so that its temperature is reduced to that desired for the delivery of the medium through a line 91 to storage in accordance with its particular characteristics. This temperature may be of the order of 107° F.

An input line 92 is provided for the heat exchanger 90 through which the motive fluid in liquid form is introduced. The motive fluid is heated in the heat exchanger 90 by the transfer of heat thereto from the hot medium, the motive fluid being delivered in liquid form through the outlet 93.

The heat exchanger 95 preferably receives the hot medium from the line 61. This medium is cooled in the heat exchanger 95 and gives up a portion of its heat so that its temperature is reduced to that desired for the delivery of the medium through a line 96 to storage in accordance with its particular characteristics. This temperature may be of the order of 75° F.

An input line 97 is provided for the heat exchanger 95 through which the motive fluid in liquid form is introduced. The motive fluid is heated in the heat exchanger 95 by the transfer of heat thereto from the hot medium, the motive fluid being delivered in liquid form through the outlet 98.

The input lines 77, 82, 87, 92 and 97 are preferably connected to an input main 99 through which water may be supplied from any suitable source by means of a pump 100 and supply line 101.

The motive fluid from the heat exchangers 75, 80, 85, 90, and 95 is supplied through the lines 78, 83, 88, 93 and 98 to a main 102. The main 102 is connected by a line 103 to the line 68 for make up in and feeding to the high temperature group of heat exchangers 40, 45, 50, 55 and 60. The excess beyond that delivered through the line 103 passes from the main 102 through a line 104 which is connected to a flash tank 105 forming part of the low pressure side of the system.

The low pressure side of the system preferably includes a plurality of groups of heat exchangers operating at a plurality of heat levels and may be of any desired form for the most effective transfer and utilization of the heat available. The heat exchangers for the low pressure side are similar to those on the high pressure side.

The heat exchangers employed on the low pressure side preferably consists of two groups, one group being operated at relatively high temperatures, but which are lower than the input temperatures on the high pressure side, the high temperature group of the low pressure side preferably receiving respective hot media at different temperatures directly from the refinery system. The other group of heat exchangers on the low pressure side are preferably operable at a lower temperature range and receive the media partially cooled in the high temperature group of heat exchangers for further heat transfer.

The cooling of the media in the low temperature group of heat exchangers of the low pressure side is preferably to such temperatures as are utilized and desired for delivery to storage of the respective products from the refining operation.

The heat exchanger 110 has the delivery line 36 connected thereto for the input of the hot medium, and the partially cooled hot medium is delivered through the line 111. An input line 112 for delivery to the heat exchanger 110 of motive fluid in liquid form is provided and an outlet 113 for the motive fluid in liquid form to which heat has been added by transfer from the hot medium is also provided.

The heat exchanger 115 has the delivery line 38 connected thereto for the input of the hot medium, and the partially cooled hot medium is delivered through the line 116. An input line 117 for delivery to the heat exchanger 115 of motive fluid in liquid form is provided and an outlet 118 for the motive fluid in liquid form to which heat has been added by transfer from the hot medium is also provided.

The heat exchanger 120 has the delivery line 35 connected thereto for the input of the hot medium, and the partially cooled hot medium is delivered through the line 121. An input line 122 for delivery to the heat exchanger 120 of motive fluid in liquid form is provided and an outlet 123 for the motive fluid in liquid form to which heat has been added by transfer from the hot medium is also provided.

The respective output lines 113, 118 and 123 are connected to a motive fluid main 124 which leads to a low pressure flash steam generator 125. The motive fluid is delivered to the low pressure flash steam generator 125 in liquid form.

The low pressure flash steam generator 125 may be of any desired type, but preferably consists of a vessel into which the liquid from the line 124 is discharged under pressure conditions such that pressure in the vessel is lower than that in the line 124 to permit the motive fluid by its pressure drop to be changed from its liquid to its gaseous or vapor form. One or more nozzles 131, may if desired, be employed for assisting in this change of condition. The major portion of the liquid is thus converted into steam at a lower pressure than that prevailing in the line 124. This pressure is dependent upon the quantity of heat available in the motive fluid in liquid form and may, if desired, be of the order of 20 pounds per square inch absolute.

The liquid in the lower part of the low pressure flash steam generator 125 is conducted through a pipe 126 to a pump 127 and from the pump 127 through a main 128 which is connected to the respective inlets 112, 117 and 122 of the heat exchangers 110, 115 and 120.

The low pressure flash steam generator 125 has the steam outlet thereof connected by a steam main 129 to a prime mover, as hereinafter more fully referred to.

The flash tank 105, heretofore referred to, also has a steam main 130 connected thereto for the withdrawal of steam preferably at the same pressure as that of the low pressure flash steam generator 125 for use together of the steam from the mains 129 and 130.

The heat exchangers of the low temperature group for the low pressure side preferably also consist of heat exchangers for a liquid-to-liquid heat exchange. These heat exchangers are preferably designed to receive the hot media from the high temperature heat exchangers 110, 115 and 120 respectively, the temperatures at which the hot media are introduced to the respective low temperature heat exchangers preferably being substantially constant and uniform.

The heat exchanger 135 is preferably designed to receive the hot medium from the line 111 and the medium after cooling within the heat exchanger 135 and the transfer of the greater portion of its heat content is delivered through a line 136 and at the desired temperature in accordance with its characteristics, for delivery to storage. This temperature may be of the order of 81° F.

An inlet 137 is provided for delivery to the heat exchanger 135 of motive fluid in liquid form and an outlet 138 is provided for the delivery of the motive fluid in liquid form and to which heat has been transferred from the hot medium for further use.

The heat exchanger 140 is preferably designed to receive the hot medium from the line 116 and the medium after cooling within the heat exchanger 140 and the transfer of the greater portion of its heat content is delivered through a line 141 and at the desired temperature in accordance with its characteristics for delivery to storage. This temperature may be of the order of 77° F.

An inlet 142 is provided for delivery to the heat exchanger 140 of motive fluid in liquid form and an outlet 143 is provided for the delivery of the motive fluid in liquid form and to which heat has been transferred from the hot medium for further use.

The heat exchanger 145 is preferably designed to receive the hot medium from the line 121 and the medium after cooling within the heat exchanger 145 and the transfer of the greater portion of its heat content is delivered through a line 146 and at the desired temperature in accordance with its characteristics for delivery to storage. This temperature may be of the order of 91° F.

An inlet 147 is provided for delivery to the heat exchanger 145 of motive fluid in liquid form and an outlet 148 is provided for the delivery of the motive fluid in liquid form and to which heat has been transferred from the hot medium for further use.

A fluid main 149 connected to the main 101 is provided, this main 149 being connected to the respective inlets 137, 142 and 147 for supplying motive fluid in liquid form thereto. The temperature of the fluid in the main 149 may be at any desired level but is preferably of the order of 70° F.

The outlets 138, 143 and 148 of the heat exchangers 135, 140 and 145 are connected to a main 150. The main 150 is connected to the line 126 for make up of motive fluid in the high temperature group of heat exchangers of the low pressure side. The main 150 is connected by a line 151 to a main 152 which in turn is connected to a flash tank 153 so that the excess of motive fluid which is not required for make up may be converted, in the flash tank 153, into steam.

The flash tank 105 also has the lower portion thereof below the liquid level therein connected by a line 154 for delivery of motive fluid in liquid form therefrom and to the main 152 for delivery into the flash tank 153. The lower part of the flash tank 153, below the liquid level thereof is connected by a line 155 to a flash tank 156 and the flash tank 156 has the lower part thereof, below the liquid level, connected to the line 157 for delivery of fluid in liquid form for discharge or for process use.

The steam main 158, to which the mains 129 and 130 are connected, is connected to the inlet or high pressure end of a suitable low pressure prime mover, such as a turbine 160. It will, of course, be understood that if desired a single turbine may be employed in place of the turbines 72 and 160 with suitable provision for supplying steam thereto at the different pressures prevailing. The flash tank 153 also has a steam main 161 connected thereto for the withdrawal of steam and delivery of the steam therefrom to the prime mover 160 at the proper stage in accordance with its pressure. This pressure may be of the order of 10 pounds per square inch absolute. The flash tank 156 also has a steam main 162 connected thereto for the delivery of steam therefrom to the prime mover 160 at a stage in accordance with its pressure. This pressure may be of the order of 5 pounds per square inch absolute.

The prime mover 160 is preferably provided with a condenser 165 for operation at a high vacuum and for this purpose a jet condenser operating at 28 inches of vacuum may be provided.

The operation of the waste heat recovery system of the present invention will now be pointed out.

The high temperature media from the refinery system are withdrawn at a plurality of points in the system at the temperatures corresponding to the characteristics of the respective media and are conducted to the heat exchangers of the high pressure side and the low pressure side for the transfer of the greater portion of their heat into the heat recovery system.

For this purpose the lines 25, 26, 28, 29 and 37 lead to the heat exchangers 40, 45, 50, 55 and 60 of the high temperature group of the high pressure side, the media in each of these lines being at a different temperature. In the heat exchangers 40, 45, 50, 55 and 60 a portion of the heat is given up and the temperature of the media at each of the outlets is maintained substantially constant and uniform with respect to the others. This temperature may be of the order of 350° F. These media are then conducted through the pipes 41, 46, 51, 56 and 61 to the low temperature heat exchangers 75, 80, 85, 90 and 95 of the low temperature group of the high pressure side where the temperatures of the respective media are again reduced, in this instance to the different temperatures desired and required for storage of the respective media.

Water supplied through the main 101 by the pump 100 is conducted by the main 99 to the inlets 77, 82, 87, 92 and 97 of the heat exchangers 75, 80, 85, 90 and 95 of the low temperature group of the high pressure side.

The motive fluid is heated in passing through these heat exchangers to the desired temperature level, which temperature level is the same as that prevailing in the line connected to the inlets of the heat exchangers 40, 45, 50, 55 and 60 of the high temperature group of the high pressure side. This temperature may be of the order of 337° F. Motive fluid in liquid form is supplied through the pipe 103 to the pipe 68 for make up.

The pump 69 maintains the flow in the line 70 and motive fluid in liquid form is delivered through the inlets 42, 47, 52, 57 and 62 to the heat exchangers 40, 45, 50, 55 and 60 of the high temperature group of the high pressure side where the liquid is heated for delivery through the outlet lines 43, 48, 53, 58 and 63 to the main 65. The temperature in the main 65 may be of the order of 350° F.

The motive fluid from the main 65 is delivered into the high pressure flash steam generator 66 where it is flashed into steam for delivery through the steam main 71 to the prime mover 72 which is operated condensing, the condensing being effected by the jet condenser 73.

The excess of motive fluid in the line 102 is delivered by the line 104 to the flash tank 105 where it is expanded, and flashed into steam, the pressure in the flash tank 105 being such as to permit this to occur.

The lines 36, 38 and 35 lead to the heat exchangers 110, 115 and 120 of the high temperature group of the low pressure side, the media in each of these lines being at a different temperature. In the heat exchangers 110, 115 and 120 a portion of the heat is given up and the temperature of the media at each of the outlets 111, 116 and 121 is maintained substantially constant and uniform with respect to each other. This temperature may be of the order of 250° F. These media are then conducted through the pipes 111, 116 and 121 to the heat exchangers 135, 140 and 145 of the low temperature group of the low pressure side where the temperatures of the respective media are again reduced, in this instance to the different temperatures desired and required for storage of the respective media.

Water supplied through the main 149 by means of the pump 100 and the main 101 is conducted by the main 149 to the inlets 137, 142 and 147 of the heat exchangers 135, 140 and 145 of the low temperature group of the low pressure side.

The motive fluid is heated in passing through these heat exchangers 135, 140 and 145 to the desired temperature level, which temperature level is the same as that prevailing in the line 126, and may be of the order of 228° F., connected to the inlets 112, 117 and 122 of the heat exchangers 110, 115 and 120 of the high temperature group of the low pressure side. Motive fluid in liquid form is supplied from the pipe 150 to the pipe 126 for make up.

The pump 127 maintains the flow in the line 128 and motive fluid in liquid form is delivered through the inlets 112, 117 and 122 to the heat exchangers 110, 115 and 120 of the high temperature group of the high pressure side where the liquid is heated for delivery through the outlet lines 113, 118 and 123 to the main 124.

The motive fluid from the main 124, which may be at a temperature of the order of 250° F., is delivered into the low pressure flash steam generator 125 where it is flashed into steam at low pressure for delivery through the steam main 129 to the steam main 158. The steam from the mains 129 and 130 is conducted by the main 158 to the prime mover 160 which is operated condensing, the condensing being effected by the jet condenser 165.

The excess of motive fluid in the line 150 beyond that required for make up is delivered by the lines 151 and 152 to the flash tank 153 where it is expanded, the pressure in the flash tank 153 being such as to permit this to occur. The steam from the flash tank 153 is conducted by the main 161 to the proper stage of the turbine 160 in accordance with its pressure and the liquid from the lower part of the flash tank 153 below the liquid level thereof is conducted through a pipe 155 to the flash tank 156, the additional steam at a lower pressure which is obtained therein being conducted by the main 162 to the turbine 160 and being introduced therein at the proper stage in accordance with its pressure.

The condenser 165 is provided for operation of the turbine 160 at a relatively high vacuum, the condensate being discarded as desired.

The water from the flash tank 156 is delivered through the pipe 157 for process use for heating or for any other desired purpose or may be discarded.

By the use of the high and low pressure sides and by splitting the heat exchange on each side into a plurality of levels a very effective utilization of the heat from the hot media may be effected without interfering in any way with the chemical condition of the media.

With the recovery system of the present invention a very large proportion of the heat which is now wasted may be converted into useful energy for power generation.

I claim:

1. A waste heat recovery system including a flash vapor generator for supplying motive fluid in vapor form, a plurality of sources of hot media at different temperature levels, a group of heat exchangers to which said media are respectively supplied for transfer of heat from said media, means for supplying motive fluid in liquid form to said heat exchangers for absorption of heat from said media, means for supplying motive fluid in liquid form from said heat exchangers to said flash vapor generator, an additional group of heat exchangers each respectively connected to one of the aforesaid heat exchangers for receiving the hot media therefrom, means for supplying motive fluid in liquid form to said second mentioned heat exchangers, and means for supplying one portion of the motive fluid from said heat exchangers to the motive fluid supply means for said first mentioned heat exchangers and the other portion of said motive fluid at reduced pressure.

2. A waste heat recovery system including a plurality of sources of hot media at different temperature levels, a plurality of heat exchangers to which the hot media are respectively delivered, means for supplying motive fluid in liquid form to said heat exchangers for absorption of heat from said media, flash vapor generating means for supplying vapor at high pressure from the motive fluid from said heat exchangers by reduction of pressure of the motive fluid, another plurality of heat exchangers to which hot media from said sources are supplied, means for supplying motive fluid in liquid form to said other heat exchangers for absorption of heat from said media, flash vapor generating means for supplying vapor at lower pressure from motive fluid in liquid form from said other heat exchangers, and means for supplying the excess of motive fluid from said first mentioned heat exchangers at low pressure in vapor form.

3. A waste heat recovery system for oil refineries including a refinery system having a plurality of sources of refinery products at different temperature levels, a plurality of heat exchangers to which certain of said refinery products are respectively delivered, means for supplying motive fluid to said heat exchangers in liquid form for absorption of heat from said refinery products, flash vapor generating means for supplying vapor at high pressure from the motive fluid in liquid form from said heat exchangers, another plurality of heat exchangers to which others of the refinery products from said sources are supplied, means for supplying motive fluid in liquid form to said other heat exchangers for absorption of heat from said other refinery products, flash vapor generating means for supplying vapor at lower pressure from the motive fluid from said other heat exchangers, and means for combining a portion of the motive fluid from said first mentioned vapor generator with the vapor generated in said other vapor generator.

4. A waste heat recovery system including a plurality of sources of hot media at different temperature levels, a first group of heat exchangers to which certain of the hot media are respectively delivered, means for supplying motive fluid to said heat exchangers for absorption of heat from said media, vapor generating means for supplying vapor at high pressure from the motive fluid from said heat exchangers, a second group of heat exchangers each respectively connected to one of the aforesaid heat exchangers for receiving hot media therefrom, means for supplying motive fluid to said second mentioned heat exchangers, and means for supplying a portion of the motive fluid from said second group of heat exchangers to the motive fluid supply means for said first group of heat exchangers and another portion of said motive fluid in vapor form at reduced pressure.

5. A waste heat recovery system including a plurality of sources of hot media at different temperature levels, a first group of heat exchangers to which certain of the hot media are respectively delivered, means for supplying motive fluid to said heat exchangers for absorption of heat from said media and for generating vapor at high pressure, a second group of heat exchangers each respectively connected to one of the aforesaid heat exchangers for receiving hot media therefrom, means for supplying motive fluid to said second mentioned heat exchangers, means for supplying a portion of the motive fluid from said second group of heat exchangers to the motive fluid supply means for said first group of heat exchangers, a third group of heat exchangers to which certain of the hot media are respectively delivered, means for supplying motive fluid to the heat exchangers of said third group for absorption of heat from said media and for generating vapor at low pressure, a fourth group of heat exchangers each respectively connected to one of the heat exchangers of the third group for receiving the hot media therefrom, means for supplying motive fluid to the heat exchangers of the fourth group, and means for supplying a portion of the motive fluid from said fourth group of heat exchangers to said third group of heat exchangers.

6. A waste heat recovery system including a plurality of sources of hot media at different temperature levels, a first group of heat exchangers to which certain of the hot media are respectively delivered, means for supplying motive fluid to said heat exchangers for absorption of heat from said media, vapor generating means connected to said first group of heat exchangers for supplying vapor at high pressure, a second group of heat exchangers each respectively connected to one of the aforesaid heat exchangers for receiving hot media therefrom, means for supplying motive fluid to said second mentioned heat exchangers, means for supplying a portion of the motive fluid from said second group of heat exchangers to the motive fluid supply means for said first group of heat exchangers and another portion of said motive fluid in vapor form at reduced pressure, a third group of heat exchangers to which certain of the hot media are respectively delivered, means for supplying motive fluid to the heat exchangers of said third group for absorption of heat from said media, vapor generating means connected to said third group of heat exchangers for supplying vapor at low pressure, a fourth group of heat exchangers each respectively connected to one of the heat exchangers of the third group for receiving the hot media therefrom, means for supplying motive fluid to the heat exchangers of the fourth group, means for supplying a portion of the motive fluid from said fourth group of heat exchangers to said third group of heat exchangers, and means for supplying the excess of motive fluid from said fourth group of heat exchangers at a lower pressure in vapor form.

7. A waste heat recovery system including a plurality of sources of hot media at different temperature levels, a first group of heat exchangers to which certain of the hot media are respectively delivered, means for supplying motive fluid in liquid form to said heat exchangers for absorption of heat from said media, flash vapor generating means connected to said first group of heat exchangers for supplying vapor at high pressure from the motive fluid from said heat exchangers by reduction of pressure of the motive fluid, a second group of heat exchangers each respectively connected to one of the aforesaid heat exchangers for receiving hot media therefrom, means for supplying motive fluid in liquid form to said second mentioned heat exchangers, means for supplying a portion of the motive fluid from said second group of heat exchangers to the motive fluid supply means for said first group of heat exchangers and another portion of said motive fluid in vapor form at reduced pressure, a third group of heat exchangers to which certain of the hot media are respectively delivered, means for supplying motive fluid in liquid form to said heat exchangers for absorption of heat from said media, flash vapor generating means connected to said third group of heat exchangers for supplying vapor at low pressure from the motive fluid in liquid form from said third group of heat exchangers, a fourth group of heat exchangers each respectively connected to one of the heat exchangers of the third group for receiving the hot media therefrom, means for supplying motive fluid in liquid form to the heat exchangers of the fourth group, means for supplying a portion of the motive fluid from said fourth group of heat exchangers to said third group of heat exchangers, and means for supplying the excess of motive fluid from said fourth group of heat exchangers at a lower pressure in vapor form.

JOHN PHILLIPS BADENHAUSEN,